US012127116B2

(12) United States Patent
Pahuja et al.

(10) Patent No.: US 12,127,116 B2
(45) Date of Patent: Oct. 22, 2024

(54) POWER SAVING IN A WIRELESS COMMUNICATION NETWORK

(71) Applicant: Nokia Solutions and Networks Oy, Espoo (FI)

(72) Inventors: Ghanender Pahuja, Bangalore (IN); Abhilash Acharya, Bangalore (IN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/414,654

(22) Filed: Jan. 17, 2024

(65) Prior Publication Data

US 2024/0251345 A1    Jul. 25, 2024

(30) Foreign Application Priority Data

Jan. 19, 2023    (FI) ..................................... 20235057

(51) Int. Cl.
     *H04B 7/185*      (2006.01)
     *H04B 17/26*      (2015.01)
     (Continued)

(52) U.S. Cl.
     CPC ........ *H04W 52/0206* (2013.01); *H04B 17/26* (2015.01); *H04B 17/3913* (2015.01)

(58) Field of Classification Search
     CPC ............... H04W 52/0206; H04B 17/26; H04B 17/3913
     (Continued)

(56) References Cited

U.S. PATENT DOCUMENTS

| 2013/0310048 A1* | 11/2013 | Hunukumbure | H04W 52/0206 |
| | | | 455/443 |
| 2021/0120434 A1* | 4/2021 | Wang | H04W 16/28 |

(Continued)

FOREIGN PATENT DOCUMENTS

| CN | 104080091 B | 10/2017 |
| WO | 2021209024 A1 | 10/2021 |

(Continued)

OTHER PUBLICATIONS

First Opinion on Patentability for corresponding Finnish application No. 20235057; dated Jun. 6, 2023 (16 pages).

(Continued)

*Primary Examiner* — Temica M Beamer
(74) *Attorney, Agent, or Firm* — Mendelsohn Dunleavy, P.C.; Steve Mendelsohn

(57) ABSTRACT

Various example embodiments relate to power saving in a wireless communication network and, in particular, an apparatus and a method to determine a threshold to establish whether a cell of a group of cells supporting network coverage in an area of a wireless communication network should enter or exit a power saving mode. In particular, aspects may provide: prediction circuitry configured to predict a future load in a group of cells supporting network coverage in an area of a wireless communication network based on historical load data for the group of cells; and determination circuitry configured to determine, based at least on the predicted future load, at least one threshold load value for establishing whether a cell of the group of cells should enter or exit a power saving mode.

20 Claims, 8 Drawing Sheets

(51) Int. Cl.
*H04B 17/391* (2015.01)
*H04W 52/02* (2009.01)

(58) Field of Classification Search
USPC .......................................................... 370/318
See application file for complete search history.

(56) References Cited

U.S. PATENT DOCUMENTS

2022/0225127 A1\* 7/2022 Imran .................. H04B 17/309
2023/0239784 A1   7/2023 Zhang et al.

FOREIGN PATENT DOCUMENTS

WO   2022227995 A1   11/2022
WO   2022257670 A1   12/2022

OTHER PUBLICATIONS

Communication of Acceptance for corresponding Finnish application No. 20235057; dated Oct. 19, 2023 (11 pages).
Sharma, Pushpendra, et al. "Why AI-powered RAN is an energy efficiency breakthrough", www.ericsson.com, 2023 [retrieved on Jun. 6, 2023] Retrieved from the Internet: <URL: https://www.ericsson.com/en/blog/2023/1/ai-powered-ran-energy-efficiency> (6 pages).
3GPP TR 28.908 V1.0.1 (Dec. 2022). 3rd Generation Partnership Project; Technical Specification Group Services and System Aspects; Study on Artificial Intelligence / Machine Learning (AI/ML) management (Release 18). (2022): 1-68.
Singh, Vaibhav, et al. "Intelligent RAN Power Saving using Balanced Model Training in Cellular Networks." 2022 20th International Symposium on Modeling and Optimization in Mobile, Ad hoc, and Wireless Networks (WiOpt). IEEE (2022): 357-364.
Gao, Yin, et al. "Machine Learning based Energy Saving Scheme in Wireless Access Networks." 2020 International Wireless Communications and Mobile Computing (IWCMC). IEEE (2020): 1573-1578.
En, Tong, et al. "A Practical eNB Off/On Based Energy Saving Scheme for Real LTE Networks." 2015 17th International Conference on Advanced Communication Technology (ICACT). IEEE (2015): 12-17.
López-Pérez, David, et al. "A survey on 5G radio access network energy efficiency: Massive MIMO, lean carrier design, sleep modes, and machine learning." arXiv preprint arXiv:2101.11246. (2021): 1-107.
Salem, Fatma Ezzahra, et al. "Traffic-aware Advanced Sleep Modes management in 5G networks." 2019 IEEE wireless communications and networking conference (WCNC). IEEE, (2019):1-6.
Beitelmal, Tamer, et al. "Sector and Site Switch-Off Regular Patterns for Energy Saving in Cellular Networks." IEEE Transactions on Wireless Communications 17.5 (2018): 2932-2945.
Extended European Search Report for corresponding European application No. 24150961.1; dated Jun 25, 2024 (13 pages).
Huawei, "(TP to TR 37.817) Remaining issues for AI based Energy Saving." 3GPP Draft R3-215665; 3GPP TSG-RAN WG3 Meeting #114-e (2021): 1-4.

\* cited by examiner

POWER SAVING IN A WIRELESS COMMUNICATION NETWORK

CROSS-REFERENCE TO RELATED APPLICATIONS

This application claims the benefit of the filing date of Finnish patent application no. 20235057 under 35 U.S.C. 119, the teachings of which application are incorporated herein by reference in their entirety.

TECHNOLOGICAL FIELD

Various example embodiments relate to power saving in a wireless communication network and, in particular, an apparatus and a method to determine a threshold to decide whether a cell should enter or exit a power saving mode.

BACKGROUND

Provision of a wireless communication network requires use of energy. Supporting a Radio Access Network (RAN) comprising, for example, a plurality of transmission and reception points (TRPs), accounts for a large part of Energy Consumption (EC) of a wireless communication network. Provision of Open Radio Access Network Radio Units (O-RU) accounts for the largest proportion of energy consumption by the RAN.

A global focus on the rarefication of fossil fuel-based energy resources and an urgent need to reduce $CO_2$ emissions make energy consumption a strategic topic for network operators. Furthermore, facilitating energy saving in a RAN may offer an operator a route to lowering ongoing costs incurred in providing and maintaining a wireless communication network.

It is desired to provide approaches which may provide a network operator with a mechanism to achieve energy saving and reduce their energy footprint.

BRIEF SUMMARY

The scope of protection sought for various example embodiments of the disclosure is set out by the independent claims. The example embodiments and features, if any, described in this specification that do not fall under the scope of the independent claims are to be interpreted as examples useful for understanding various embodiments of the invention.

According to various, but not necessarily all, example embodiments of the disclosure there is provided an apparatus comprising: at least one processor; and at least one memory storing instructions that when executed by the at least one processor cause the apparatus at least to: predict a future load in a group of cells supporting network coverage in an area of a wireless communication network based on historical load data for the group of cells; and determine, based at least on the predicted future load, at least one threshold load value for establishing whether a cell of the group of cells should enter or exit a power saving mode.

According to some embodiments, entering the power saving mode comprises: deactivation or powering off a cell or a carrier of a cell of the group of cells. According to some embodiments, entering the power saving mode comprises: deactivation or powering off at least one cell or a carrier of a cell of the group of cells. According to some embodiments, exiting the power saving mode comprises: activation or powering on a cell or a carrier of a cell of the group of cells.

According to some embodiments, exiting the power saving mode comprises: activation or powering on at least one cell or a carrier of a cell of the group of cells.

According to some embodiments the group of cells comprises a "power saving group" of cells. According to some embodiments, the group of cells comprises a logic entity called a power saving group or power group. Radio cells can be assigned to the same Power Saving Group according to some embodiments provided they: cover the same geographical area and belong to the same base station, for example, the same eNB. According to some embodiments, each cell of a network can be assigned to only one Power Saving Group. According to some embodiments, a Power Saving Group may contain one or more cells. According to some embodiments, cells are assigned to a Power Saving Group either manually or automatically through application of an appropriate algorithm to available network cells.

According to some embodiments, the historical load data comprises at least one of the following: radio link condition, traffic, cell throughput, downlink physical resource block utilisation, or a number of active user equipment within the group of cells.

According to some embodiments, the future load comprises at least one of the following: a predicted downlink physical resource block utilisation, a predicted cell throughput or a predicted number of active user equipment within the group of cells.

According to some embodiments, determining the at least one threshold load value comprises: determining a threshold load value for whether a cell of the group of cells should enter the power saving mode and determining a threshold load value for whether a cell of the group of cells should exit the power saving mode. In other words, there is a separate threshold for activation and deactivation of the power saving mode. In some embodiments, the threshold load for activation of energy saving is different to the threshold load for deactivation of energy saving.

According to some embodiments, predicting the future load in the group of cells comprises: predicting a load which may occur in the group of cells during at least two time windows; and determining the at least one threshold load value comprises: determining the at least one threshold load value for each time window based on the predicted load which may occur in the group of cells during that time window.

According to some embodiments, predicting the future load in the group of cells comprises: predicting a load which may occur in the group of cells during a future time period; and determining the at least one threshold load value comprises: determining the at least one threshold load value for each future time period based on the predicted load which may occur in the group of cells during that future time period.

According to some embodiments, the time window or future time period may comprise: a time period comprising one or more days, a time period of a day, a time period of a portion of day, an hour or several hours, a portion of an hour, a number of minutes. According to some embodiments, the time window may comprise, for example, a fifteen minute interval. According to some embodiments, determining at least one threshold may comprise: determining the at least one threshold to apply in each of a series of consecutive time windows or future time periods.

According to some embodiments, determining the at least one threshold load value is based at least partly upon assessed network performance in the area of the wireless communication network supported by the group of cells.

According to some embodiments, assessing network performance is based at least partly on a downlink characteristic experienced by user equipment in the area of the wireless communication network supported by the group of cells.

According to some embodiments, the downlink characteristic comprises: downlink throughput experienced by user equipment in the area of the wireless communication network supported by the group of cells.

According to some embodiments, determining the at least one threshold load value comprises: selecting a threshold load value which provides an energy saving whilst maintaining network performance in the area of the wireless communication network supported by the group of cells.

According to some embodiments, determining said at least one threshold load value comprises: selecting, calculating or evaluating the at least one threshold load value which, when implemented in the group of cells, based on the predicted load of the group of cells, provides an energy saving. According to some embodiments, determining said at least one threshold load value comprises: selecting said at least one threshold load value which provides greatest energy saving. According to some embodiments, determining said at least one threshold load value comprises: selecting a threshold load value which provides maximum energy saving.

According to some embodiments, determining the at least one threshold load value comprises: determining the at least one threshold value at which a cell of the group of cells can enter a power saving mode without degrading network performance experienced by user equipment in the area of the wireless communication network supported by the group of cells.

According to some embodiments, the apparatus is further configured to: adjust the determined at least one threshold load value based upon a determination of whether at least one monitorable key performance indicator of the network is adversely impacted by implementation of the determined at least one threshold load value.

According to some embodiments, the apparatus is configured to: adjust the determined at least one threshold load value by: determining whether said at least one monitorable key performance indicator is degrading and, if so, adjusting the at least one threshold load value. According to some embodiments, the apparatus is configured to: adjust the determined at least one threshold load value by: determining whether said at least one monitorable key performance indicator is degrading and, if not, maintaining the determined at least one threshold load value.

According to some embodiments, the at least one monitorable key performance indicator of the network comprises a monitorable indicator of at least one of the following: accessibility, retainability, or downlink cell throughput.

Accessibility of a network may, for example, comprise a measure of how many UE connections to a network are successfully completed compared to a number of requested UE connections to a network. In some embodiments, accessibility may be indicated by, for example:

Accessibility=$RRC$ connection setup completions/ $RRC$ connection requests)×100

Retainability of a network may, for example, comprise a measure of how many radio bearers are dropped abnormally compared to a number of expected radio bearer releases. In some embodiments, retainability may be indicated by, for example:—

Retainability=abnormal $RB$ releases/total $RB$ releases)×100

According to some embodiments, the apparatus comprises: a load forecasting machine learning module configured to perform the prediction of a future load in the group of cells supporting network coverage in the area of a wireless communication network based on historical load data for the group of cells.

According to some embodiments, the load forecasting machine learning module comprises a load forecasting machine learning model.

According to some embodiments, the forecasting machine learning model is configured to use historical load data associated with the group of cells supporting network coverage in the area of a wireless communication network to predict a future load on the group of cells supporting network coverage in the area of a wireless communication network.

According to some embodiments, the historical load data is used to forecast n minutes in the future where n is the inference frequency of a threshold prediction model applied by the load forecasting machine learning module.

According to some embodiments, the load forecasting machine learning model comprises a univariate nested MLP [multi-layer perceptron].

According to some embodiments, the load forecasting machine learning model is configured to predict: a number of active user equipment in the group of cells.

According to some embodiments, the load forecasting machine learning model is configured to predict: downlink physical resource block utilisation level in the group of cells.

According to some embodiments, the apparatus comprises: a threshold evaluation machine learning module configured to determine, based at least on the predicted future load, the at least one threshold load value for establishing whether a cell of the group of cells should enter or exit a power saving mode.

According to some embodiments, the threshold evaluation machine learning module is configured to determine the at least one threshold load value for a selected group of cells.

According to some embodiments, the threshold evaluation machine learning module is configured to determine, based on one or more input factors, one or more threshold load value at which power saving steps can be activated or deactivated within the group of cells.

According to some embodiments, the threshold evaluation machine learning module determines the one or more threshold load value based upon: a load prediction output from the load forecasting machine learning module.

According to some embodiments, the threshold evaluation machine learning module determines the one or more threshold load value based upon: one or more parameter indicative of user experience within the group of cells.

According to some embodiments, one or more parameter indicative of user experience comprises an indicator of current radio condition or customer experience.

According to some embodiments, the threshold evaluation machine learning module applies a custom reward function configured to increase energy saving within the group of cells whilst maintaining user experience within the group of cells.

According to some embodiments, the threshold evaluation machine learning module is configured to assess user experience within the group of cells based upon an indication of user equipment downlink throughput.

According to some embodiments, the threshold evaluation machine learning module comprises a double deep Q network reinforcement learning model.

According to come embodiments, the double deep Q network reinforcement learning model is configured to determine the one or more threshold load value.

According to some embodiments, the threshold evaluation machine learning module is configured to implement a reinforcement learning process.

According to some embodiments, the reinforcement learning process comprises: selecting a base at least one threshold value in dependence upon the prediction of energy saving based upon a future load in the group of cells supporting network coverage in the area of a wireless communication network based on historical load data for the group of cells.

According to some embodiments, the reinforcement learning process comprises: applying a custom reward function to the base value, the custom reward function operating to increase energy saving achieved across the group of cells whilst maintaining user experience operating within the area of network coverage within the wireless communication network supported by the group of cells.

According to some embodiments: the custom reward function comprises: a score associated with a calculated characteristic of user experience operating within the area of network coverage within the wireless communication network supported by the group of cells.

According to some embodiments: the custom reward function comprises a score associated with a calculated key performance characteristic within the area of network coverage within the wireless communication network supported by the group of cells.

According to some embodiments, the apparatus comprises: a key performance indicator feedback machine learning module configured to determine whether at least one monitorable key performance indicator of the network is adversely impacted by implementation of the determined at least one threshold load value based upon a monitored indication of the monitorable key performance indicator.

According to some embodiments, the key performance indicator feedback machine learning module is configured to provide feedback to threshold evaluation machine learning module based upon a comparison of one or more experienced monitorable indication within the group of cells compared to one or more predicted monitorable indication within the group of cells.

According to some embodiments, the key performance indicator feedback machine learning module is configured to assess performance of the group of cells, based on a comparison of one or more measurable characteristic of operation of the group of cells with a prediction of the one or more measurable characteristic of operation of the group of cells.

According to some embodiments, the key performance indicator feedback machine learning module is configured to apply a statistical model to compare current performance of a group of cells, with one or more past historic pattern of performance of the group of cells using a hypothesis test.

According to some embodiments, the hypothesis test may comprise one or more of: Mann Whitney test; T-test and/or a Kruskal Wallis test.

According to some embodiments, the apparatus comprises a network control node. According to some embodiments, the apparatus is further configured to provide the determined at least one threshold value to a network control node for implementation of the energy saving mode.

According to some embodiments, the apparatus is further configured to provide the determined at least one threshold value to a near Real Time Radio Access Network Intelligent Controller for implementation of the energy saving mode in a cell or cells of the group of cells.

According to various, but not necessarily all, example embodiments of the disclosure there is provided a computer implemented method comprising: predicting a future load in a group of cells supporting network coverage in an area of a wireless communication network based on historical load data for the group of cells; anddetermining, based at least on the predicted future load, at least one threshold load value for establishing whether a cell of the group of cells should enter or exit a power saving mode.

According to some embodiments, entering the power saving mode comprises: deactivation or powering off a cell or a carrier of a cell of the group of cells. According to some embodiments, entering the power saving mode comprises: deactivation or powering off at least one cell or a carrier of a cell of the group of cells. According to some embodiments, exiting the power saving mode comprises: activation or powering on a cell or a carrier of a cell of the group of cells. According to some embodiments, exiting the power saving mode comprises: activation or powering on at least one cell or a carrier of a cell of the group of cells.

According to some embodiments the group of cells comprises a "power saving group" of cells. According to some embodiments, the group of cells comprises a logic entity called a power saving group or power group. Radio cells can be assigned to the same Power Saving Group according to come embodiments provided they: cover the same geographical area and belong to the same base station, for example, the same eNB. According to some embodiments, each cell of a network can be assigned to only one Power Saving Group. According to some embodiments, a Power Saving Group may contain one or more cells. According to some embodiments, cells are assigned to a Power Saving Group either manually or automatically through application of an appropriate algorithm to available network cells.

According to some embodiments, the historical load data comprises at least one of the following: radio link condition, traffic, cell throughput, downlink physical resource block utilisation, or a number of active user equipment within the group of cells.

According to some embodiments, the future load comprises at least one of the following: a predicted downlink physical resource block utilisation, a predicted cell throughput or a predicted number of active user equipment within the group of cells.

According to some embodiments, determining the at least one threshold load value comprises: determining a threshold load value for whether a cell of the group of cells should enter the power saving mode and evaluating a threshold load value for whether a cell of the group of cells should exit the power saving mode. In other words, there is a separate threshold for activation and deactivation of the power saving mode. In some embodiments, the threshold load for activation of energy saving is different to the threshold load for deactivation of energy saving.

According to some embodiments, predicting the future load in the group of cells comprises: predicting a load which may occur in the group of cells during at least two time windows; and determining the at least one threshold load value comprises: determining the at least one threshold load value for each time window based on the predicted load which may occur in the group of cells during that time window.

According to some embodiments, predicting the future load in the group of cells comprises: predicting a load which may occur in the group of cells during a future time period and determining the at least one threshold load value comprises: determining the at least one threshold load value for each future time period based on the predicted load which may occur in the group of cells during that future time period.

According to some embodiments, the time window or future time period may comprise a time period comprising one or more days, a time period of a day, a time period of a portion of a day, an hour or several hours, a portion of an hour, a number of minutes. According to some embodiments, the time window may comprise, for example, a fifteen minute interval. According to some embodiments, determining the at least one threshold may comprise: determining the at least one threshold to apply in each of a series of consecutive time windows or future time periods.

According to some embodiments, determining the at least one threshold load value is based at least partly upon assessed network performance in the area of the wireless communication network supported by the group of cells.

According to some embodiments, assessing network performance is based at least partly on a downlink characteristic experienced by user equipment in the area of the wireless communication network supported by the group of cells.

According to some embodiments, the downlink characteristic comprises: downlink throughput experienced by user equipment in the area of the wireless communication network supported by the group of cells.

According to some embodiments, determining the at least one threshold load value comprises: selecting, calculating or evaluating the at least one threshold load value which, when implemented in the group of cells, based on the predicted load of the group of cells, provides an energy saving. According to some embodiments, determining said at least one threshold load value comprises: selecting said at least one threshold load value which provides greatest energy saving. According to some embodiments, determining said at least one threshold load value comprises: selecting a threshold load value which provides maximum energy saving.

According to some embodiments, determining the at least one threshold load value comprises: determining the at least one threshold value at which a cell of the group of cells can enter a power saving mode without degrading network performance experienced by user equipment in the area of the wireless communication network supported by the group of cells.

According to some embodiments, the method comprises: adjusting the determined at least one threshold load value based upon a determination of whether at least one monitorable key performance indicator of the network is adversely impacted by implementation of the determined at least one threshold load value.

According to some embodiments, the method comprises: adjusting the determined at least one threshold load value by: determining whether said at least one monitorable key performance indicator is degrading and, if so, adjusting the at least one threshold load value and, if not, maintaining the determined at least one threshold load value. According to some embodiments, the method comprises: adjusting the determined at least one threshold load value by: determining whether said at least one monitorable key performance indicator is degrading and, if not, maintaining the determined at least one threshold load value.

According to some embodiments, the at least one monitorable key performance indicator of the network comprises a monitorable indicator of at least one of the following: accessibility, retainability, or downlink cell throughput.

Accessibility of a network may, for example, comprise a measure of how many UE connections to a network are successfully completed compared to a number of requested UE connections to a network. In some embodiments, accessibility may be indicated by, for example:

Accessibility=RRC connection setup completions/
RRC connection requests)×100

Retainability of a network may, for example, comprise a measure of how many radio bearers are dropped abnormally compared to a number of expected radio bearer releases. In some embodiments, retainability may be indicated by, for example:—

Retainability=abnormal RB releases/total RB
releases)×100

According to some embodiments, the method comprises: providing a load forecasting machine learning module configured to perform the prediction of a future load in the group of cells supporting network coverage in the area of a wireless communication network based on historical load data for the group of cells.

According to some embodiments, the load forecasting machine learning module comprises a load forecasting machine learning model.

According to some embodiments, the forecasting machine learning model is configured to use historical load data associated with the group of cells supporting network coverage in the area of a wireless communication network to predict a future load on the group of cells supporting network coverage in the area of a wireless communication network.

According to some embodiments, the historical load data is used to forecast n minutes in the future where n is the inference frequency of a threshold prediction model applied by the a load forecasting machine learning module.

According to some embodiments, the load forecasting machine learning model comprises a univariate nested MLP [multi-layer perceptron].

According to some embodiments, the load forecasting machine learning model is configured to predict: a number of active user equipment in the group of cells.

According to some embodiments, the load forecasting machine learning model is configured to predict: downlink physical resource block utilisation level in the group of cells.

According to some embodiments, the method comprises: providing a threshold evaluation machine learning module configured to determine, based at least on the predicted future load, the at least one threshold load value for establishing whether a cell of the group of cells should enter or exit a power saving mode.

According to some embodiments, the threshold evaluation machine learning module is configured to determine the at least one threshold load value for a selected group of cells.

According to some embodiments, the threshold evaluation machine learning module is configured to determine, based on one or more input factors, one or more threshold load value at which power saving steps can be activated or deactivated within the group of cells.

According to some embodiments, the threshold evaluation machine learning module determines the one or more threshold load value based upon: a load prediction output from the load forecasting machine learning module.

According to some embodiments, the threshold evaluation machine learning module determines the one or more threshold load value based upon: one or more parameter indicative of user experience within the group of cells.

According to some embodiments, one or more parameter indicative of user experience comprises an indicator of current radio condition or customer experience.

According to some embodiments, the threshold evaluation machine learning module applies a custom reward function configured to increase energy saving within the group of cells whilst maintaining user experience within the group of cells.

According to some embodiments, the threshold evaluation machine learning module is configured to assess user experience within the group of cells based upon an indication of user equipment downlink throughput.

According to some embodiments, the threshold evaluation machine learning module comprises a double deep Q network reinforcement learning model.

According to come embodiments, the double deep Q network reinforcement learning model is configured to determine the one or more threshold load value.

According to some embodiments, the threshold evaluation machine learning module is configured to implement a reinforcement learning process.

According to some embodiments, the reinforcement learning process comprises: selecting a base at least one threshold value in dependence upon the prediction of energy saving based upon a future load in the group of cells supporting network coverage in the area of a wireless communication network based on historical load data for the group of cells.

According to some embodiments, the reinforcement learning process comprises: applying a custom reward function to the base value, the custom reward function operating to increase energy saving achieved across the group of cells whilst maintaining user experience operating within the area of network coverage within the wireless communication network supported by the group of cells.

According to some embodiments: the custom reward function comprises: a score associated with a calculated characteristic of user experience operating within the area of network coverage within the wireless communication network supported by the group of cells.

According to some embodiments: the custom reward function comprises a score associated with a calculated key performance characteristic within the area of network coverage within the wireless communication network supported by the group of cells.

According to some embodiments, the method comprises: providing a key performance indicator feedback machine learning module configured to determine whether at least one monitorable key performance indicator of the network is adversely impacted by implementation of the determined at least one threshold load value based upon a monitored indication of the monitorable key performance indicator.

According to some embodiments, the key performance indicator feedback machine learning module is configured to provide feedback to threshold evaluation machine learning module based upon a comparison of one or more measured monitorable indication within the group of cells compared to one or more predicted monitorable indication within the group of cells.

According to some embodiments, the key performance indicator feedback machine learning module is configured to assess performance of the group of cells, based on a comparison of one or more measured measurable characteristic of operation of the group of cells with a prediction of the one or more measurable characteristic of operation of the group of cells.

According to some embodiments, the key performance indicator feedback machine learning module is configured to apply a statistical model to compare current performance of a group of cells, with one or more past historic pattern of performance of the group of cells using a hypothesis test.

According to some embodiments, the hypothesis test may comprise one or more of: Mann Whitney test; T-test and/or a Kruskal Wallis test.

According to some embodiments, the method is performed by a network control node.

According to some embodiments, the method comprises providing the determined at least one threshold value to a network control node for implementation of the energy saving mode.

According to some embodiments, the method comprises providing the determined at least one threshold value to a near Real Time Radio Access Network Intelligent Controller for implementation of the energy saving mode in a cell or cells of the group of cells.

According to various, but not necessarily all, example embodiments of the disclosure there is provided a computer program product operable, when executed on a computer, to perform the steps of: predicting a future load in a group of cells supporting network coverage in an area of a wireless communication network based on historical load data for the group of cells; and determining, based at least on the predicted future load, at least one threshold load value for establishing whether a cell of the group of cells should enter or exit a power saving mode.

According to various, but not necessarily all, example embodiments, there is provided a non-transitory computer readable medium comprising program instructions stored thereon for performing at least the following: predicting a future load in a group of cells supporting network coverage in an area of a wireless communication network based on historical load data for the group of cells; and determining, based at least on the predicted future load, at least one threshold load value for establishing whether a cell of the group of cells should enter or exit a power saving mode.

According to various, but not necessarily all, example embodiments of the disclosure there is provided an apparatus comprising: prediction means configured to predict a future load in a group of cells supporting network coverage in an area of a wireless communication network based on historical load data for the group of cells; and determination means configured to determine, based at least on the predicted future load, at least one threshold load value for establishing whether a cell of the group of cells should enter or exit a power saving mode.

According to various, but not necessarily all, example embodiments of the disclosure there is provided an apparatus comprising: prediction circuitry configured to predict a future load in a group of cells supporting network coverage in an area of a wireless communication network based on historical load data for the group of cells; and determination circuitry configured to determine, based at least on the predicted future load, at least one threshold load value for establishing whether a cell of the group of cells should enter or exit a power saving mode.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION

Some example embodiments will now be described with reference to the accompanying drawings in which:

FIG. 2 illustrates graphically one example of load-based threshold values for cell switch off and switch on;

DETAILED DESCRIPTION

Figure 1:
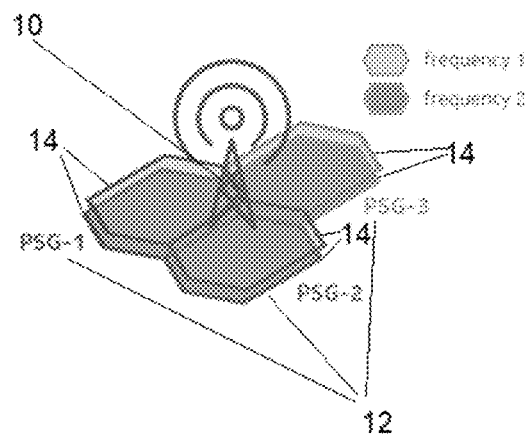
FIG. 1 illustrates schematically a wireless communication network comprising a power saving group.

Before discussing the example embodiments in any more detail, first an overview of the context in which arrangements may be understood is provided.

As set out above, energy consumption of a Radio Access Network is a consideration for network operators.

By way of example, the energy consumption of a 4G Radio Access Network (RAN) accounts for 20-25% of the network Total Cost of Ownership (TCO) (see (GSMA Future Network Programme, 2019)), and operators globally spend nearly 17 billion dollars per year on energy alone (see (GSMA Climate Action Programme, 2019)).

The energy needs of future networks are likely to exceed current demand due to increased cellular densities, use of MIMO and massive MIMO systems and further advances in wireless technologies. Such factors in combination with a need to reduce carbon emissions to zero by mid-century, make energy saving a significant consideration in relation to any large-scale network infrastructure.

Radio Network base stations consume most of the energy used by the RAN. Much of the base station energy usage is attributable to provision of Power Amplifiers (PAS) at the base stations, although baseband processing and switching also contribute. Accordingly, many energy saving features use base station operation as an optimization target.

It will be appreciated that energy consumption of a network can be reduced by improving the energy efficiency of the network, and/or by introducing energy saving operation, for example, switching off a carrier in the network. Whilst energy saving is important, network providers typically also consider quality of service and functionality provided by a wireless communication network to users of that network. Therefore, energy saving methods may be influenced by network load and a requirement for a network to support operation of user equipment within that network.

Accordingly, it will be appreciated that it is possible to implement load-based power saving for multi-layer networks to provide an energy saving functionality that mitigates degradation of a user experience. In particular, it is possible to monitor Physical Resource Block (PRB) utilization across a group of cells. That group of cells may be considered a Power Saving Group (PSG), sometimes referred to as a Power Group (PG). If or when the PRB utilization in the PSG is determined to drop below a pre-configured fixed threshold, a network may be configured to operate such that it switches off one or more cells in the Power Savings Group via a controlled shutdown procedure, sometimes referred to as a graceful shutdown. The network may be further configured to operate such that it switches cell(s) of the PSG back on if or when the determined PRB utilization of the PSG passes another pre-configured fixed threshold. The fixed threshold for cell shut down within a PSG may, of course, differ from the fixed threshold for cell switch on within a PSG. The fixed thresholds may be set centrally and may apply across some or all PSGs in a network.

Typically, load-based power saving according to such an approach may operate such that cells are switched off during the night, which is when load on the network is generally lighter and fewer active user equipment (UE) could be affected by cell shutdown.

To implement load-based power saving in accordance with such a load-based approach, a logic entity called a power saving group is created. Radio cells in a wireless communication network can be assigned to the same Power Saving Group if they: cover the same geographical area and belong to the same base station, for example, the same eNB. Each cell can be assigned to only one Power Saving Group. A Power Saving Group may contain one or more cells. Cells can be assigned to Power Saving Groups either manually or automatically through application of an appropriate algorithm to available cells.

Having described the context surrounding energy saving approaches in a wireless communication network, a general overview of operation according to possible arrangements is provided:

Arrangements recognise that it is possible to implement a dynamic and flexible energy saving approach, which may offer advantages compared to the fixed load-based threshold methodology set out above.

Rather than implementing a fixed threshold which may be the same for all cells across all power saving groups at all times, described methodologies recognise that energy saving can be achieved by implementing an approach which allows for evaluation of a threshold for implementation of energy saving steps based upon expected load experienced in cells of a power saving group.

Analysing a historical load data pattern may allow for an expected load for each cell to be predicted. Using a predicted or expected future load in evaluation of a dynamic threshold may allow for implementation of more effective threshold load values to determine whether a cell should be switched off or on. Evaluation of a more dynamic threshold load value may lead to an increase in power saving periods (time during which a cell is switched off). Thus, energy saving within a network may be increased or improved. By selecting a threshold based upon likely, or predicted, load to be experienced within a cell, it is likely that implemented power saving periods may be such that they have a reduced effect on end user experience.

According to some arrangements, a threshold applied to cells of a power saving group can be calculated on a power saving group by power saving group basis within a network. The threshold value(s) may be calculated for a future interval based on a predicted future load experienced by cell(s) of the power saving group over that future interval.

In other words, arrangements may support evaluation of load threshold(s) to be applied within a power saving group based across one or more future time windows. The threshold to be applied in each time window may be based on a predicted future load during each of those time windows. In this way, the threshold load values applied over time within a power saving group may vary. The threshold load values applied within each power saving group can be customised for the power saving group and for each time window. Such an approach can allow greater energy savings to be achieved, since variable threshold values can be implemented to more accurately identify when a cell of a power saving group is a candidate to achieve power saving.

Some aspects recognise that it is possible to make a decision to perform cell switch off in relation to a carrier, or multiple carriers, of a cell or cells of a Power Saving Group based upon whether it is likely that such a switch off can be performed so that, from a user perspective (UE perception), there will be no degradation to the UE experience. Degradation of UE experience may, for example, comprise incurring UE out of coverage issues or a degradation in communication performance or, for example, poor throughput. Some aspects recognise that variable threshold approaches may require knowledge of historic and/or current cell usage parameters. Such cell usage parameters may be required on a cell by cell, or Power Saving Group by Power Saving Group basis. Some aspects recognise that it is possible to implement variable threshold approaches using appropriate Machine Learning (ML) or Artificial Intelligence (AI) methods.

In some example embodiments, threshold load values may be evaluated for each cell in a power group separately. In this way, customised threshold load values for each cell can be generated.

Similarly, in some example embodiments, threshold load values may be evaluated for each power saving group separately thus generating customised threshold load values to be applied within each power saving group. Since each power saving group may experience different traffic loads, having improved control over individual power saving groups can result in an improvement in power saving across a communication network.

Methodologies in accordance with described approaches operate to predict, set or implement two thresholds: "lbpsmaxload" and "lbpsminload". lbpsminload is a threshold load value for determining whether a cell should be switched off and lbpsmaxload is a threshold load value for determining whether a cell should be switched on.

When an overall aggregated load in a Power Saving Group [for example, average Guaranteed Bit Rate (GBR) traffic, average Non-GBR traffic, average PDCCH] is determined to be below "lbpsminload" then one or more cells/carriers can be switched off. Similarly, if the aggregated load is determined to be greater than "lbpsmaxload" then one or more cells/carriers will be switched on.

It will be appreciated that cell switch off can be applied to a capacity layer while ensuring that a coverage layer will be maintained and always radiating. Methodologies allow for a sequence to be defined according to which cells get switched off to maintain such functionality.

Methodologies according to described approaches recognise that determining appropriate thresholds may require consideration of when to switch off a cell without impacting the UE performance, and such threshold(s) can depend upon multiple factors.

Factors of relevance can be different for different PSGs. In particular, the relevant factors for a Power Saving Group may comprise consideration of: PSG cell coverage (i.e., the radio conditions that the UE in the cell may experience); traffic load (for example, Physical Resource Block (PRB) utilization, number of active UE); and Key Performance Indicators (KPIs). Within a single cell there can be different seasonality to take into account, for example, typical hourly, daily, weekly or similar factors. Accordingly, some factors may include an indication of time, for example, via time stamps.

Methodologies in accordance with arrangements may recognise that "lbpsminload" and "lbpsmaxload" thresholds can be different for different Power Groups, and predictions of "lbpsminload" and "lbpsmaxload" may be made on a Power Saving Group by Power Saving Group basis. Similarly, methodologies in accordance with arrangements may recognize that the allocation of cells in a network to power saving groups and then setting appropriate thresholds may also be an optimizable factor when applying described approaches. Methodologies in accordance with arrangements recognise that, even for a given power saving group, thresholds to be implemented may change, since the conditions and factors of relevance within the cells of that PSG may change, for example, as a day/month/year progresses, and adjustment to the threshold(s) may be appropriate.

According to methodologies described, various factors may be taken into account when setting or predicting one or more threshold to trigger cell switch off, or cell activation to achieve energy saving in a wireless communication network. Factors which may be accounted for can include:
1) Load conditions [indicators may include: PRB Utilization, Active UEs]
2) Radio conditions [indicators may include: RSRP distribution, CQI distribution, RSRQ distribution, SINR distribution]
3) UE placement [indicators may include: Timing Advance]
4) Throughput [indicators may include: downlink (D/L) Cell throughput, uplink (U/L) cell throughput, D/L UE throughput, U/L UE throughput]

Methodologies described provide an apparatus comprising: prediction circuitry configured to predict a future load in a group of cells supporting network coverage in an area of a wireless communication network based on historical load data for the group of cells; and determination circuitry configured to determine, based at least on the predicted future load, at least one threshold load value for establishing or deciding whether a cell of the group of cells should enter or exit a power saving mode.

FIG. 1 illustrates schematically a wireless communication network comprising a power saving group. In particular, FIG. 1 shows a base station 10 which is part of a wireless communication network supporting three PSGs 12 (PSG-1, PSG-2, PSG-3). Each PSG 12 is formed of two cells 14 utilising two different frequencies (frequency 1 and frequency 2). It will be appreciated that each PSG 12 may comprise a different number of cells 14, for example, one or more cells. It will also be appreciated that the base station 10 may support a different number of PSGs 12, for example, one or more PSGs.

Arrangements described may provide an apparatus and a method for determining whether at least one cell within at least one PSG should enter or exit a power saving mode in order to achieve power savings without compromising user equipment experience within a wireless communication network. Entering and exiting a power saving mode may comprise switching a cell, or one or more carrier of a cell, off or on respectively.

Figure 2:
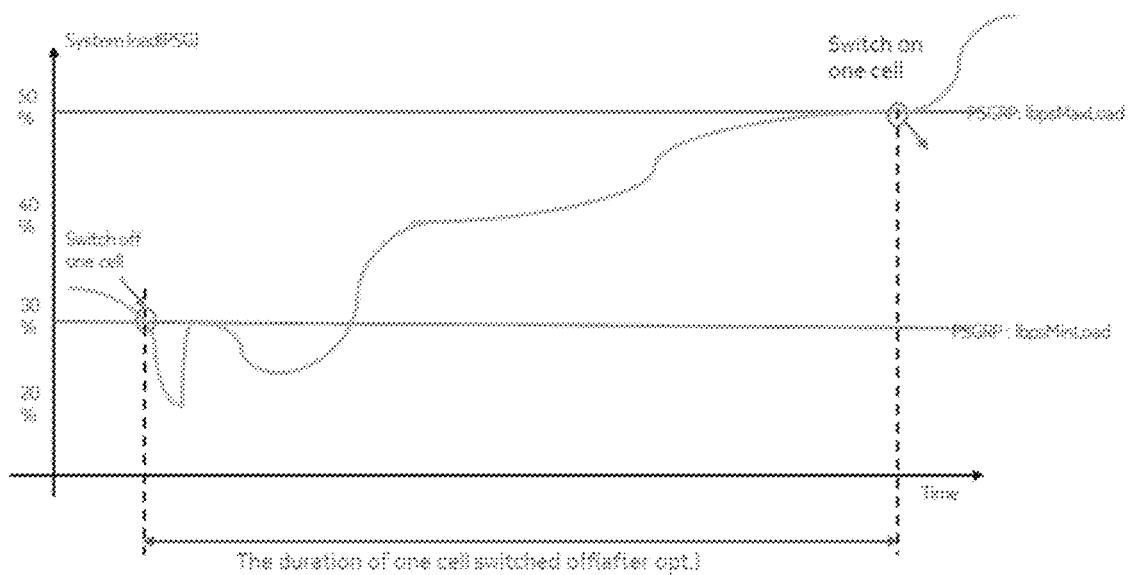

FIG. 2 illustrates graphically one example of load-based threshold values for implementation of a power saving mode within a cell of a power saving group. FIG. 2 shows power saving group load (y-axis) as a function of time (x-axis). The power saving mode implemented by the power saving group comprises cell switch off (and switch on, as appropriate). As shown graphically in FIG. 2, when it is determined that a system load within cells forming a power saving group (Y-axis) has fallen below a selected threshold "lbpsMin-Load", steps are taken such that a cell of the power saving group is switched off to save power. When it is determined that the system load within cells forming the power saving group has passed a threshold lbpsMaxLoad, steps are taken to switch back on a deactivated cell, thus ensuring sufficient network service can be provided to user equipment within an area covered by the power saving group cells.

Arrangements operate to provide mechanisms to select and implement one of more of the thresholds lbpsMinLoad and lbpsMaxLoad. Those thresholds may be assessed for implementation in one or more cells forming a power saving group. The thresholds may change over a period of known time intervals. A power saving group may, for example, operate such that the applied threshold(s) change in accordance with expected system load within the power saving group. The expected system load may be determined based upon historic experienced system load within a given power saving group.

Arrangements described may provide for one threshold for each of "lbpsmin" and "lbpsmax" which can be applied for across cells of a power saving group. The combined load of the entire power saving group, across multiple cells, can be compared with the threshold(s) and then one or more cells in accordance with a configured sequence can be switched On or Off if the appropriate threshold is passed. The threshold for each of "lbpsmin" and "lbpsmax" which can be applied for across cells of a power saving group for a particular time period, and may vary across a time period, for example, the thresholds may vary across hours of a day, days of a week, across months if seasonal factors are of relevance to a power saving group.

Having described general methodologies in accordance with arrangements, a specific detailed implementation is now described.

Example Implementation: Use of Machine Learning Techniques to Predict Threshold(s)

Whilst methodologies described may use computational methods to analyze factors as they occur, and assess one or more threshold to be applied by a network in relation to a PSG, it will be appreciated that methodologies described may also provide a mechanism to predict likely changes in some factors experienced within a power saving group and therefore make an advance assessment of one or more thresholds to be applied by a network in relation to a PSG over known time period.

Furthermore, it may be possible to provide dynamic assessment of factors to implement one or more thresholds to be applied by a network in relation to a PSG. Some implementations, in particular the ones described in more detail below, implement machine learning and artificial intelligence engines in support of the methodologies described.

In particular, arrangements described may provide machine learning and artificial intelligence engines to apply algorithms which are configured to define threshold(s) to be applied by PSGs. Such an approach supports power saving strategies for cells in different regions with different traffic patterns and radio behavior and may support automated cell or carrier switch off (and/or automatic cell or carrier switch on) in order to provide energy saving efficiency and control the impact of such switch off/on to the performance of the network in a region (as perceived by a user of that network, for example, based on UE downlink throughput).

Figure 3:
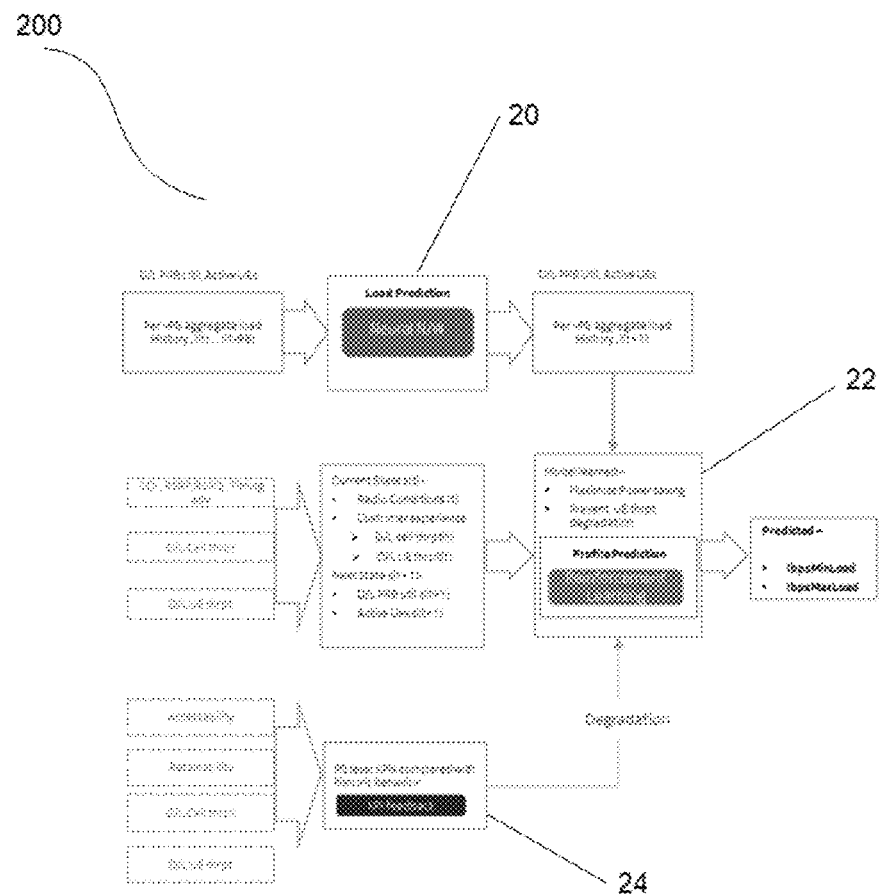
FIG. 3 illustrates schematically some main functional components of an example arrangement.

FIG. 3 illustrates schematically some main functional components of an example arrangement. The system 200 of FIG. 3 comprises: a load forecasting machine learning engine 20, a threshold prediction machine learning engine 22, and a key performance indicator checking engine 24. The operation of those components is described in more detail below. According to an arrangement, a near real time RAN Intelligent Controller (Near-RT RIC) may be configured to use an operations and maintenance (O&M) interface to apply parameter(s) determined by system 200.

The system 200 is configured to use artificial intelligence (AI) and machine learning (ML) algorithms to define power saving strategies for cells forming power saving groups. Those power saving groups may be located in different regions with exhibit different traffic patterns and/or different radio behaviours. The system 200 may be used to support automatic cell or carrier switch off in order to maximize energy saving efficiency and minimize impact to the cell performance in a radio access network.

The system 200 is configured such that it can take into account different threshold predictions to be applied in different Power Saving Groups, such thresholds being based on different patterns experienced in those power saving groups. The patterns may relate to parameters including, for example, radio condition, traffic patterns and throughput experience. The system 200 may also operate such that different threshold(s) are predicted for the same power saving group across, for example, a 24 hr period. The evaluation of different threshold(s) may be based on pattern changes within the power saving group across the 24 hour period. The patterns may relate to parameters including, for example, radio condition, traffic patterns and throughput experience.

The system 200 may offer a route to prediction of load threshold(s) for implementation to achieve energy saving within a network. The threshold(s) evaluated by system 200 may be utilised by a near real-time radio access network intelligent controller. According to some arrangements, a near real-time radio access network intelligent controller may be configured to utilise a local machine learning model. The variable threshold(s) which may be evaluated by system 200 and implemented in a network can allow for an increase in overall power saving time in a power saving group and/or may support decreased energy consumption by a power saving group of a network.

As described above, main components of system 200 comprise: load forecasting machine learning engine 20, threshold prediction machine learning engine 22, and optionally key performance indicator checking engine 24.

Load forecasting machine learning engine 20 is configured to predict future load conditions at power group level. In particular, load forecasting engine is configured to use artificial intelligence or machine learning techniques to predict future load condition at power group level, based upon, for example, historic load data. The machine learning engine 20 may, for example, be configured to project a likely load condition of a power saving group over a future interval. The projection may be based upon historic load condition experienced in a power saving group over an equivalent interval. The projection may be based upon historic load condition experienced in a power saving group over an equivalent interval and a contemporaneous, or current load condition being experienced by the power saving group.

The threshold prediction machine learning engine 22 may comprise a Double Deep Q Network (DDQN) reinforcement machine learning model created at a power group level. The output of the threshold prediction engine 22 is an evaluated threshold comprising: lbpsminload and/or lbpsmaxload, or in other words: load values which are a trigger for initiation, within a power saving group, of an energy saving mechanism, for example, cell or carrier switch on or off. The threshold prediction engine 22 is configured to apply a custom reward function which seeks to increase energy saving achieved at a power saving group level, whilst in parallel seeking to maintain, or at least not degrade, user experience within a network. User experience within a network may be assessed, for example, based upon experienced user equipment downlink throughput. The machine learning engine may, in predicting a threshold, take into account one or more of: a load prediction output from the machine learning engine 20 for example, downlink physical resource block utilisation (PRB utilization) over an expected upcoming time interval (t+15); and/or number of active user equipment within the power saving group or cell(s) of the power saving group over an expected upcoming time interval. The machine learning engine 20 may, in predicting a threshold, take into account one or more parameter relating to UE experience within the power saving group, for example, RSRP (t)—current experience; RSRQ (t)—current experience; CQI (t)—current experience; Cell D/L thrpt (t)—current experience; and/or UE D/L thrpt (t)—current experience.

In some arrangements, a key performance indicator checking engine 24 is provided. According to such arrangements, feedback can be provided to the threshold prediction machine learning engine 22 based upon a comparison of currently experienced parameter(s) within a power saving group compared to those predicted or expected. In other words, the performance of the threshold prediction engine may be adapted based upon an assessment of one or more aspect of performance of the power saving group.

Key performance indicator (KPI) feedback checking engine 24 may operate to form a closed loop feedback with the threshold prediction machine learning engine 22, through hypothesis testing. The checking engine 24 may be configured to apply a statistical model to compare current performance assessed at a power group level, with one or more past historic pattern using a hypothesis test. The checking engine 24 may be configured to provide feedback to the threshold prediction engine 22. That feedback may result in the threshold prediction engine 22 operating defensively if the checking engine 24 determines there is user experience degradation. The operation of the threshold prediction engine 22 may remain same in the case that the KPI feedback checking engine 24 determines that there is no change or an improvement in the considered user equipment or power saving group KPIs. According to some implementations, KPIs which are not part of reinforcement learning model reward function but are key for UE perception can be monitored, and action taken to adjust the threshold(s) based upon such monitoring. Such KPIs may include, for example, retainability, accessibility, and/or cell downlink throughput.

Arrangements may operate to achieve energy saving by allowing one or multiple carriers or cells in a power saving group to switch off. According to some implementations, multiple carriers can be switched off in a predefined sequence one by one or together. All models described in relation to the arrangement below are created at Power Group level. It will be appreciated that models may be created such that they span across two or more power saving groups, or may be created at a cell level.

Load Forecasting

Energy Saving is achieved via cell or carrier switch off, and such switch off decisions can be taken by considering likely load to be experienced in a power group in the future. Account can be taken of whether remaining cells of the same power group (ie those which are not switched off) will be able to provide services to user equipment without degrading the performance.

The forecasting ML model 20 is configured to use historical load data such as downlink PRB utilization and/or number of active UEs within a power saving group to predict a future load on the power saving group.

With regard to the load forecasting machine learning model 20: in one implementation a univariate nested MLP [multi-layer perceptron] is created to predict a) Active UEs and b) D/L PRB utilization.

With regard to training the model, in one implementation, historical data, for example, the past 14 days of data, can be taken and used to forecast n minutes in the future where n is the inference frequency of the "Threshold Prediction model" applied by engine 22.

With regard to data structure [i/p data], in one implementation, considering 15 min as the inference frequency of the proposed solution, so the i/p data has been changed to 15 min granularity.

Input data is the nested structure of data with 3 arrays here one day seasonality, i.e., 96 previous time stamps will be considered and 14 days data will be restructured as shown in the below example.

Mentioned is the single row of the i/p data to the model, it's a nested with 3 layers

|   | i/p data | | o/p data | |
|---|---|---|---|---|
| t | t + 1 . | . . t + 96 | [t + 97, | [so $99^{th}$ is the |
|   | t + 1 . | . . . t + 97 | t + 98, | required predicted |
|   | t + 2 . . . | . t + 98 | t + 99] | o/p the current |
|   |   |   |   | structure needs |
|   |   |   |   | past historic 98 |
|   |   |   |   | steps data to |
|   |   |   |   | predict $99^{th}$ step |
|   |   |   |   | in future.] |

Figure 9:
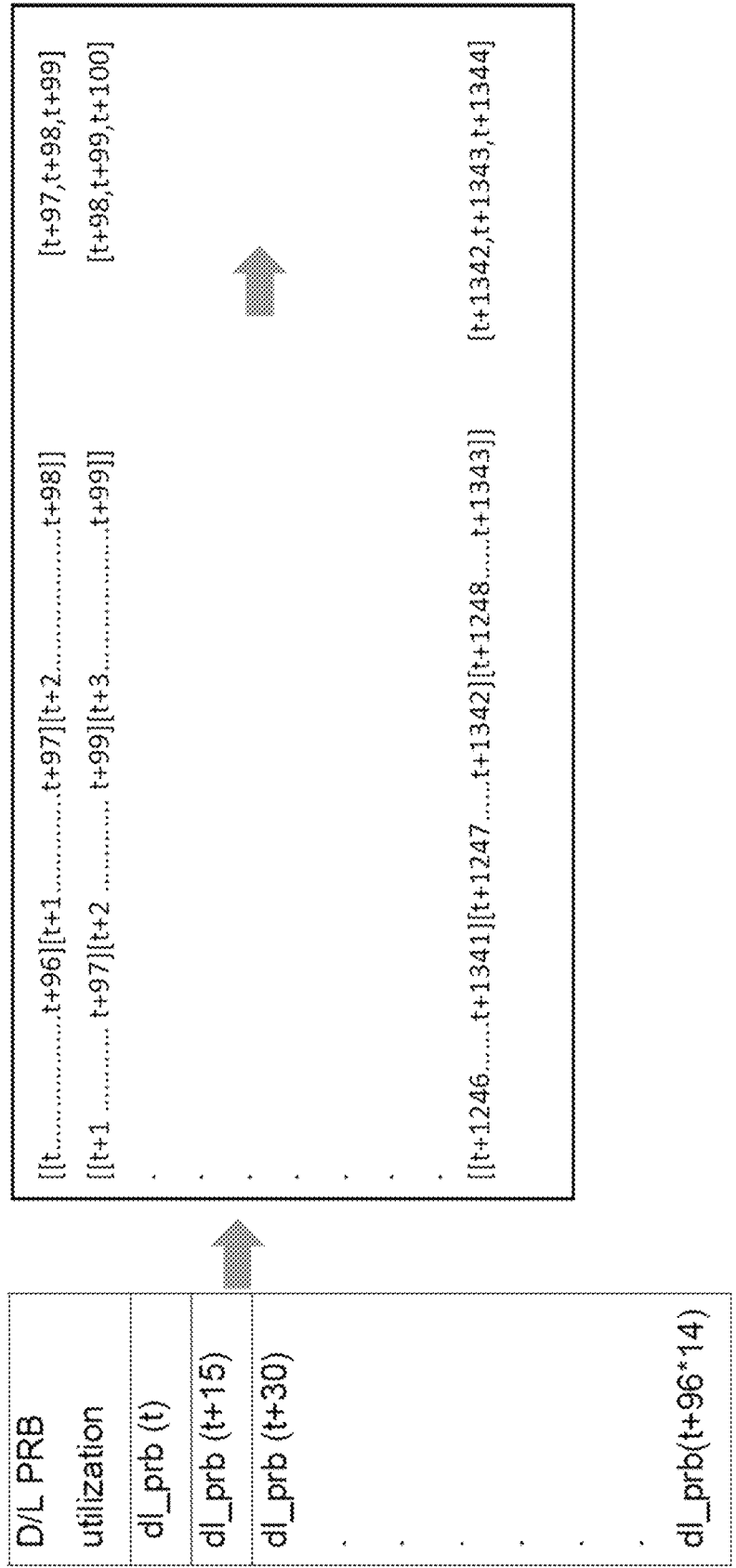
FIG. 9 shows the data structure of nested neural n/w model.

14 days of data with 15 minutes granularity, i.e., 96 time stamps per day and 14*96=1344 timestamps for 14 days. FIG. 9 shows the data structure of nested neural n/w model where to infer the 1 event of future [i.e. 15 min in future] it needs the past 98 steps [i.e. 98*15 mins].

```
MLP Model architecture —
Model: "model"
_____
Layer
(type)                    Output Shape      Param #      Connected to
=================================================================cell_i
nfo (InputLayer)          [(None, 1)]       0            [ ]
input_data (InputLayer)   [(None, 3, 96)]   0            [ ]
embedding (Embedding)     (None, 1, 20)     80           ['cell_info[0][0]'] flatten
(Flatten)                 (None, 288)       0            ['input_data[0][0]'] flatten_1
(Flatten)                 (None, 20)        0            ['embedding[0][0]'] concatenate
(Concatenate)             (None, 308)       0            ['flatten[0][0]','flatten_1[0][0]']
dense (Dense)             (None, 116)       35844        ['concatenate[0][0]']
dense_1 (Dense)           (None, 4)         468          ['dense[0][0]']
=================================================================
```

Total params: 36,392
Trainable params: 36,392
Non-trainable params: 0

Threshold Prediction

The threshold evaluation machine learning module 22 of a system 200 in accordance with an arrangement is configured to evaluate, based on one or more input factors, one or more threshold load value to at which power saving steps can be activated or deactivated within a power saving group. The threshold(s) evaluated by the threshold evaluation module may increase power saving achievable within a network.

The threshold prediction engine may be 22 configured to apply a custom reward function which seeks to increase energy saving achieved at a power saving group level, whilst in parallel seeking to maintain, or at least not degrade, user experience within a network. User experience within a network may be assessed, for example, based upon experienced user equipment downlink throughput. The machine learning engine 22 may, in predicting a threshold, take into account one or more of: a load prediction output from the machine learning engine 20 for example, downlink physical resource block utilisation (PRB utilization) over an expected upcoming time interval (t+15); and/or number of active user equipment within the power saving group or cell(s) of the power saving group over an expected upcoming time interval. The machine learning engine 22 may, in predicting a threshold, take into account one or more parameter relating to UE experience within the power saving group, for example, the current radio conditions (CQI, RSRP, RSRQ and timing advance) and customer experience (current downlink cell throughput and current downlink UE throughput).

The threshold prediction module 22 recognises that for every power saving group the radio pattern, load threshold, and KPI performance will be different so thresholds "lbpsminload and lbpsmaxload" evaluated by the threshold prediction module 22 will differ across power saving groups. Furthermore, the threshold prediction module is configured such that, within a given power saving group, the functional pattern changes based on seasonality within a day and the load thresholds "lbpsminload and lbpsmaxload" will be likely vary across a 24 hour period.

With regard to the threshold prediction model 22, in one implementation, a Double Deep Q Network (DDQN) reinforcement learning model is configured to evaluate two thresholds: "lbpsminload and lbpsmaxload"
Profile Prediction DDQN Network:
Net(
  (fc): Sequential(
    (0): Linear(in_features=12, out_features=128, bias=True)
    (1): ReLU( )
    (2): Linear(in_features=128, out_features=256, bias=True)
    (3): ReLU( )
    (4): Linear(in_features=256, out_features=10, bias=True)
  )
)

With regard to the training data to be used in relation to the threshold prediction module 22, in one implementation, a simulator or real world live eNBs can be considered with active UEs.

In one implementation, a table is created with specific combinations of "lbpsminload and lbpsmaxload", each pairing being referred as a particular load based energy saving profile

| minLoad | maxLoad | Profile |
|---------|---------|---------|
| 1       | 5       | P01     |
| 5       | 15      | P02     |
| 8       | 20      | P03     |
| 10      | 25      | P04     |
| 15      | 35      | P05     |
| 20      | 40      | P06     |
| 25      | 45      | P07     |
| 30      | 50      | P08     |
| 35      | 55      | P09     |
| 40      | 60      | P10     |

*The values mentioned in the table can be customized to suit a particular implementation envisaged by a network operator According to one implementation, random profiles are applied across Day 1 to Day 10 in relation to selected Power Groups and Real Time Protocol Messaging (RTPM) data is captured and tagged with the profiles applied.

| Time              | Cell Id | feature 1 | feature 2 | feature n | Profile applied         |
|-------------------|---------|-----------|-----------|-----------|-------------------------|
| dd/mm/yy hh:mm    | XXYY    |           |           |           | lbsmin-10/ lbsmax-20    |

According to one implementation, during training the aggregated load of a power saving group is compared with random profile ["lbpsminload and lbpsmaxload"] applied which results in associated power saving switching ON & OFF given the condition is satisfied, and that label is added. Features are created, for example:
1) PST1—in 15 min intervals: how many minutes is at least 1 carrier is switched off
2) PST2—No. of carriers which are switched off
3) PST3—Total minutes of saving [multi carrier]

| Time | PG Id | FEATURE 1 | FEATURE 2 | FEATURE n | PST1 | PST2 | PST3 | Profile applied |
|---|---|---|---|---|---|---|---|---|
| dd/mm/yy hh:mm | XXYY | | | | | | | lbsmin-10/ lbsmax-20 |

According to one implementation, per bin there is label of ON and OFF, i.e. where PST1>0

According to one implementation, the 10 day data is converted to data in 2 hr bin [as a moving sliding window of 15 min] and from day 3 onwards, a comparison can be made with past 3 days median of same time window and a comparison can be made [weekday vs weekday and weekend vs weekend] such comparisons can be tagged as: Improvement, Degradation or No change. [Note:—Only samples where the power saving group is in and energy saving mode are used [i.e. out of 16 samples in 4 hrs only those samples where at least 1 carrier is off]

It will be appreciated that throughput ranges mentioned above are custom and can be adapted.

Furthermore, it will be appreciated that the level of reward and nature of the reward associated with various factors can be customised and adapted to suit an outcome desired by a RAN provider.

In one implementation, the threshold prediction engine 22 may be configured to apply a further reward factor based upon % KPI change, where $$\text{Additional Reward Based \% KPI change} = (\text{Current value} - \text{Previous value})/\text{Previous Value}$$

| Time | PG Id | FEATURE 1 | FEATURE 2 | FEATURE n | PST1 | PST2 | PST3 | Profile applied | KPI Comparison | ES_Status |
|---|---|---|---|---|---|---|---|---|---|---|
| Nov. 2, 2022 00:00 | XXYY | | | | | | | lbsmin-10/ lbsmax-20 | Improvement | OFF |
| Nov. 2, 2022 00:15 | | | | | | | | | Improvement | ON |
| Nov. 2, 2022 00:30 | | | | | | | | | Improvement | ON |
| Nov. 2, 2022 00:45 | | | | | | | | | No Change | OFF |
| Nov. 2, 2022 01:00 | | | | | | | | | Improvement | OFF |
| Nov. 2, 2022 01:15 | | | | | | | | | Improvement | OFF |
| Nov. 2, 2022 01:30 | | | | | | | | | Degradation | OFF |
| Nov. 2, 2022 01:45 | | | | | | | | | Improvement | ON |

According to one implementation, a reward can be evaluated. Threshold evaluation engine 22 may, for example, be configured to learn that OFF is a desired O/P along with "No degradation" or "Improvement" in assessed KPIs.

Accordingly, the buckets based on all the possible combinations of columns: "ES Status" and "KPI Comparison" are:
OFF_degradation,
OFF_nochange,
OFF_Improvement,
ON_degradation,
ON_nochange,
ON_Improvement In one implementation, the threshold prediction engine 22 is configured to apply a base reward according to:
Base Reward=[−2, 1, 2, 0, 0, 0] ##[OFF_D, OFF_N, OFF_I, ON_D, ON_N, ON_I]
And an additional Reward Based on KPI Range
=1 (if UE_dl_throughput<=3 mbps)
=0.75 (if UE_dl_throughput<=5 mbps and UE_dl_throughput>3 mbps)=
=0.5 (if UE_dl_throughput<=7 mbps and UE_dl_throughput>5 mbps)
=0.25 (if UE_dl_throughput<=10 mbps and UE_dl_throughput>7 mbps)
=0 (if UE_dl_throughput>10 mbps)

In one implementation, the threshold prediction engine 22 may be configured to apply an additional reward based on KPI feedback, for example according to:

If (Additional Reward Based % KPI change)<0    i.

Min(1,[(Additional Reward Based on KPI Range)* (Reward factor Based % KPI change)])

If (Additional Reward Based % KPI change)>=0    ii.

Min (1,[(1−Additional Reward Based on KPI Range) *(Reward factor Based % KPI change)])

In some implementations, the threshold prediction engine may be configured to apply an additional reward based on Power Saving Duration, for example:

Power Saving Duration No. of Carriers in OFF state/ Total no. of carriers (0/0.33/0.66/1)

Accordingly, in some implementations, the threshold prediction engine may be configured to apply a Total Reward where $$\text{Total Reward} = \text{Base Reward} + \text{Additional Reward Based on KPI feedback} + \text{Additional Reward based on Power Saving Duration}$$

| Time | PG Id | FEATURE 1 | FEATURE 2 | FEATURE n | PST1 | PST2 | PST3 | Profile applied Profile | Reward |
|---|---|---|---|---|---|---|---|---|---|
| dd/mm/yy hh:mm | XXYY | | | | | | | lbsmin-10/ lbsmax-20 | |

In some implementations, the threshold prediction engine is configured to create the threshold prediction model as an offline DDQN.

Once an appropriate model has been created by system 200, and in particular, by machine learning modules 20 and 22, a network may be configured to receive threshold parameters from the system 200 and a near-RT RIC may utilize the threshold(s) via an operations and maintenance (O&M) interface to apply these parameters to network operation.

KPI Feedback

In some arrangements, a key performance indicator checking engine 24 is provided. According to such arrangements, feedback can be provided to the threshold prediction machine learning engine 22 based upon a comparison of currently experienced parameter(s) within a power saving group compared to those predicted or expected. In other words, the performance of the threshold prediction engine may be adapted based upon an assessment of one or more aspect of performance of the power saving group.

Key performance indicator (KPI) feedback checking engine 24 may operate to form a closed loop feedback with the threshold prediction machine learning engine 22, through hypothesis testing. The checking engine 24 may be configured to apply a statistical model to compare current performance assessed at a power group level, with one or more past historic pattern using a hypothesis test. The checking engine 24 may be configured to provide feedback to the threshold prediction engine 22. That feedback may result in the threshold prediction engine 22 operating defensively if the checking engine 24 determines there is user experience degradation. The operation of the threshold prediction engine 22 may remain same in the case that the KPI feedback checking engine 24 determines that there is no change or an improvement in the considered user equipment or power saving group KPIs. According to some implementations, KPIs which are not part of reinforcement learning model reward function but are key for UE perception can be monitored, and action taken to adjust the threshold(s) based upon such monitoring. Such KPIs may include, for example, retainability, accessibility, and/or cell downlink throughput.

Regarding the KPI performance feedback checking engine 24, in one implementation, a statistical model is configured to compare current performance of a cells forming a power saving group within a network with past historic patterns. The comparison may be implemented using a hypothesis test. The feedback checking engine 24 may, according to some implementations, be configured to provide feedback to the threshold prediction engine.

In one implementation, the KPI performance feedback checking engine may be configured to provide feedback to a DDQN reinforcement machine learning model forming threshold prediction engine 22. The feedback provided may be such that the threshold prediction engine "goes defensive" if there is any degradation and remain unchanged in a case where KPI feedback indicates that there is "No change" or "improvement" in the considered KPIs.

According to some implementations, the KPI performance feedback engine may operate such that KPIs which are not part of the standard reinforcement learning model reward function applied by threshold prediction engine 22, but are key for UE perception, are monitored. Such KPIs may include, for example: Retainability; Accessibility and/ or Cell D/L throughput.

Hypothesis Tests

According to some implementations, closed loop KPI feedback is provided to the threshold prediction engine 22 through Hypothesis tests performed by KPI feedback engine 24.

Regarding the KPI feedback engine 24, KPIs which are not part of a "Threshold Prediction" model but are relevant to UE perception towards a network can be continuously monitored. If the feedback indicates that there is degradation of such KPIs as a result of application of threshold(s) evaluated by the threshold prediction engine 22, the KPI feedback engine may provide a mechanism by which the prediction made by the threshold evaluation engine can be adapted.

According to some implementations, one or more hypothesis tests can be used to compare a current pattern with historic patterns.

Possible hypothesis tests to be used may comprise one or more of: Mann Whitney test; T-test and Kruskal Wallis test.

Figure 4:
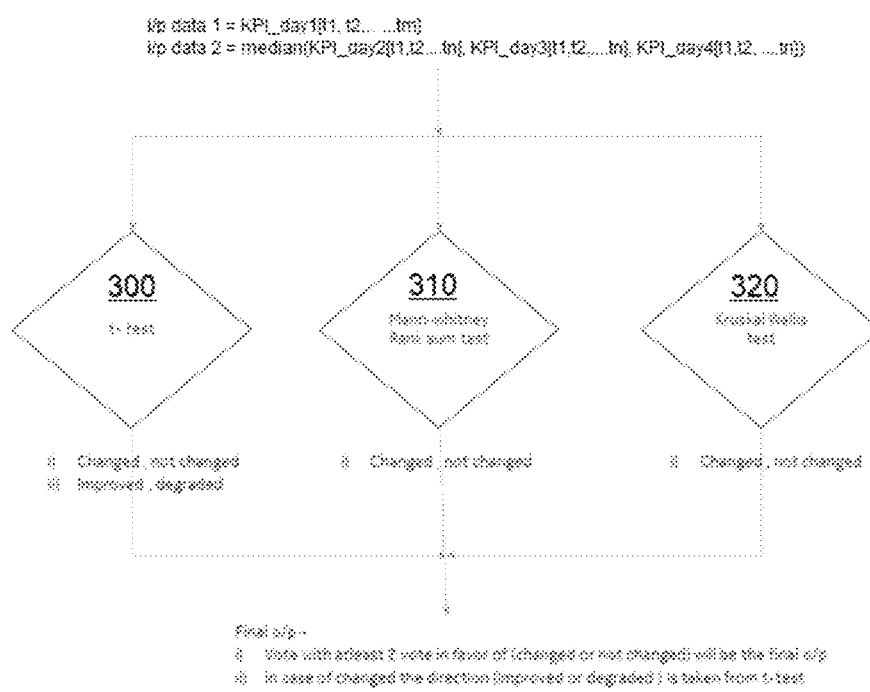
FIG. 4 illustrates schematically a voting scheme applicable by a KPI performance engine according to one arrangement.

FIG. 4 illustrates schematically a voting scheme applicable by a KPI performance engine according to one arrangement. In the arrangement shown in FIG. 4, three distinct hypothesis tests are applied 300, 310, 320. The KPI performance engine 24 may vote based upon a summarised outcome across the three tests.

According to some implementations, a hypothesis test may operate as follows: to compare with a sliding window of 15 mins, take past 4 hrs of data, and compare Day1 (d1) for same time bins with the median or Geo mean of the same time stamps of the past 3 days data.

| Time | | ERAB Drop rate [day1] | ERAB Drop rate [day2] | ERAB Drop rate [day3] | ERAB Drop rate [day4] |
|---|---|---|---|---|---|
| 00:00 | t1 | DR_d2_t1 | DR_d3_t1 | DR_d4_t1 | DR_d1_t1 |
| 00:15 | t2 | DR_d2_t2 | DR_d3_t2 | DR_d4_t2 | DR_d1_t2 |
| 00:30 | t3 | DR_d2_t3 | DR_d3_t3 | DR_d4_t3 | DR_d1_t3 |
| 00:45 | t4 | DR_d2_t4 | DR_d3_t4 | DR_d4_t4 | DR_d1_t4 |
| 01:00 | t5 | DR_d2_t5 | DR_d3_t5 | DR_d4_t5 | DR_d1_t5 |
| 01:15 | 16 | DR_d2_t6 | DR_d3_t6 | DR_d4_t6 | DR_d1_t6 |
| 01:30 | t7 | DR_d2_t7 | DR_d3_t7 | DR_d4_t7 | DR_d1_t7 |
| 01:45 | t8 | DR_d2_t8 | DR_d3_t8 | DR_d4_t8 | DR_d1_t8 |
| 02:00 | 19 | DR_d2_t9 | DR_d3_t9 | DR_d4_t9 | DR_d1_t9 |
| 02:15 | t10 | DR_d2_t10 | DR_d3_t10 | DR_d4_t10 | DR_d1_t10 |
| 02:30 | t11 | DR_d2_t11 | DR_d3_t11 | DR_d4_t11 | DR_d1_t11 |
| 02:45 | t12 | DR_d2_t12 | DR_d3_t12 | DR_d4_t12 | DR_d1_t12 |
| 03:00 | t13 | DR_d2_t13 | DR_d3_t13 | DR_d4_t13 | DR_d1_t13 |
| 03:15 | t14 | DR_d2_t14 | DR_d3_t14 | DR_d4_t14 | DR_d1_t14 |
| 03:30 | t15 | DR_d2_t15 | DR_d3_t15 | DR_d4_t15 | DR_d1_t15 |
| 03:45 | t16 | DR_d2_t16 | DR_d3_t16 | DR_d4_t16 | DR_d1_t16 |

-continued

Median/Geo Mean horizontally of
these three days will be compared with the d1

| Time | ERAB Drop rate [day 1] | ERAB Drop rate [day 2, 3, 4] |
|---|---|---|
| 00:00 t1 | DR_d1_t1 | median(DR_d2_t1, DR_d3_t1, DR_d4_t1) |
| 00:15 t2 | DR_d1_t2 | median(DR_d2_t2, DR_d3_t2, DR_d4_t2) |
| 00:30 t3 | DR_d1_t3 | median(DR_d2_t3, DR_d3_t3, DR_d4_t3) |
| 00:45 t4 | DR_d1_t4 | median(DR_d2_t4, DR_d3_t4, DR_d4_t4) |
| 01:00 t5 | DR_d1_t5 | median(DR_d2_t5, DR_d3_t5, DR_d4_t5) |
| 01:15 t6 | DR_d1_t6 | median(DR_d2_t6, DR_d3_t6, DR_d4_t6) |
| 01:30 t7 | DR_d1_t7 | median(DR_d2_t7, DR_d3_t7, DR_d4_t7) |
| 01:45 t8 | DR_d1_t8 | median(DR_d2_t8, DR_d3_t8, DR_d4_t8) |
| 02:00 t9 | DR_d1_t9 | median(DR_d2_t9, DR_d3_t9, DR_d4_t9) |
| 02:15 t10 | DR_d1_t10 | median(DR_d2_t10, DR_d3_t10, DR_d4_t10) |
| 02:30 t11 | DR_d1_t11 | median(DR_d2_t11, DR_d3_t11, DR_d4_t11) |
| 02:45 t12 | DR_d1_t12 | median(DR_d2_t12, DR_d3_t12, DR_d4_t12) |
| 03:00 t13 | DR_d1_t13 | median(DR_d2_t13, DR_d3_t13, DR_d4_t13) |

According to the schematic arrangement illustrated in FIG. 4. Three separate hypothesis tests, 300, 310, 320 can be applied independently by KPI performance engine 24 and a result will be concluded if a minimum of 2 votes out of 3 is achieved.

T-Test

A t-test is a statistical test that is used to compare the means of two groups. It is often used in hypothesis testing to determine whether a process or treatment actually has an effect on the population of interest, or whether two groups are different from one another.

Output (o/p) of t test
⇒ ttest (d1, median(d2,d3,d4))
  1) p value 2) statistic
  statistic >0 [improvement]
  statistic <0 [degradation]
  p value <0.05 null hypothesis is not true [i.e. both groups are different]
  p value >0.05 null hypothesis is true [i.e. both groups are same]
  Python code:
  from scipy import stats
  stats.ttest_ind(d1,median(d2,d3,d4))
  if [(p<0.05) and (statistic <0)]—degradation
  if [(p<0.05) and (statistic >0)]—improvement Mann and Whitney's U-Test Mann and Whitney's U-test or Wilcoxon rank-sum test is a non-parametric statistic hypothesis test that is used to analyze the difference between two independent samples of ordinal data.

p value <0.05 null hypothesis is not true [i.e. both groups are different]

p value >0.05 null hypothesis is true [i.e. both groups are same]

Kruskal Wallis Test

The Kruskal Wallis test is a non-parametric alternative to the One Way ANOVA. Non-parametric means that the test doesn't assume that data comes from a particular distribution. The test determines whether the medians of two or more groups are different.

p value <0.05 null hypothesis is not true [i.e. population medians are not equal.]

p value >0.05 null hypothesis is true [i.e. population medians are equal.]

Algo Flow -1 [KPI feedback closed loop through Hypothesis test]

KPI Feedback Engine Final Conclusion

The KPI performance feedback indicator engine 24 according to some arrangements may be configured to apply, for example the three separate hypothesis tests mentioned above independently across all selected KPIs of interest. One example selection of KPIs include: Accessibility; Retainability; D/L Cell throughput and D/L UE throughput.

The KPI feedback engine may be configured, in some implementations, to compute a score. The computed score may be used to trigger an appropriate feedback loop to threshold prediction engine 22. The feedback score may operate to ensure that selection of final predictions of "threshold(s)" to apply in relation to power saving steps are defensive.

By way of example, the KPI performance feedback engine may operate to implement scores according to:
Degraded base score=-2
Improved base score=2
No change=0

Weightings (Wn) may be applied in relation to the monitored KPIs of interest.

Final score=[$w1$.KPI1basescore+$w2$.KPI2basescore+$w3$.KPI3basescore+$w4$.KPI4basescore]

If there are four KPIs of interest and they are of equal interest then:

$w1+w2+w3+w4=1$ e.g. $w1=w2=w3=w4=0.25$

And so:

| KPI1basescore | Degraded | -2 |
|---|---|---|
| KPI2basescore | Degraded | -2 |
| KPI3basescore | Improved | 2 |
| KPI4basescore | No change | 0 |

Final Score=[(0.25*-2)+(0.25*-2)+(0.25*2)+(0.25*0)]

Figure 5:
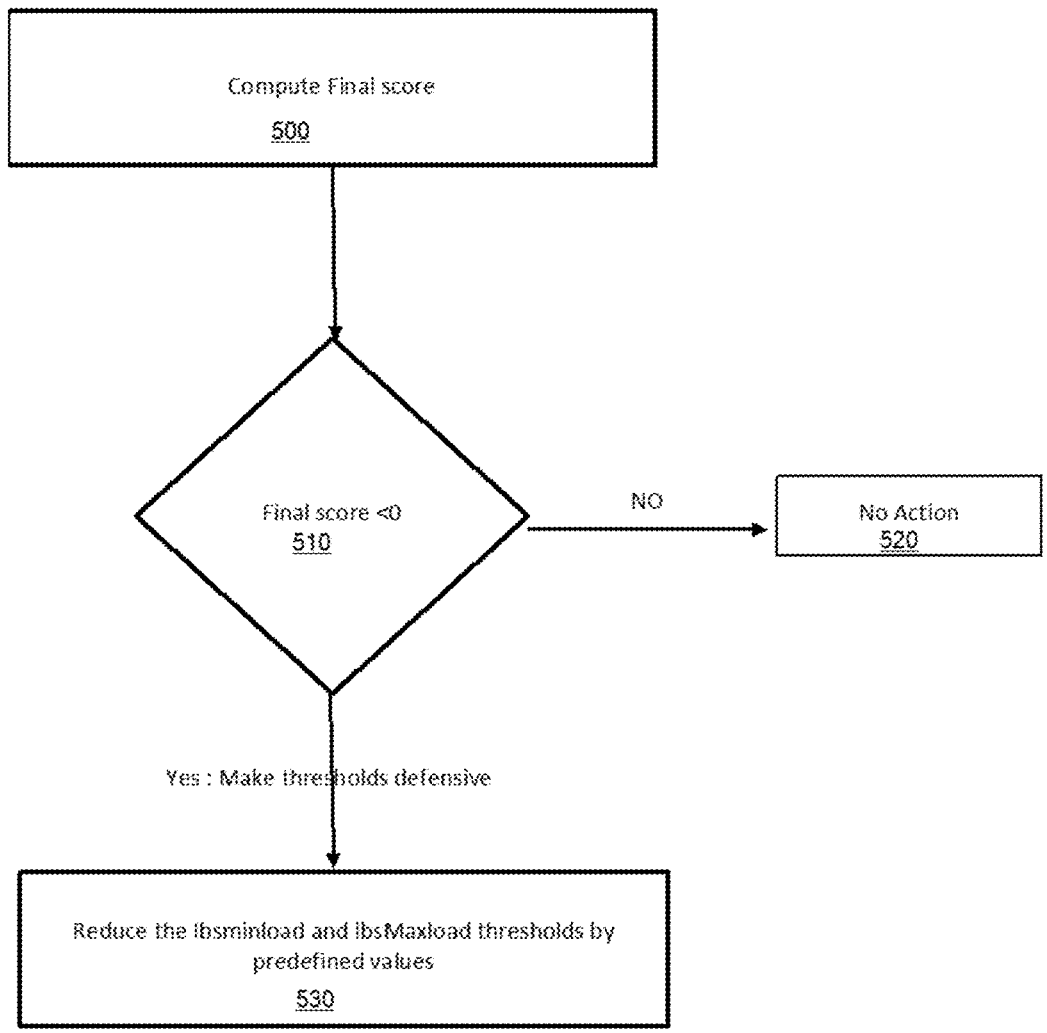
FIG. 5 is a flowchart illustrating schematically how a threshold prediction engine may be adapted to take into account feedback resulting from one or more Key Performance Indicator.

FIG. 5 is a flowchart illustrating schematically how a threshold prediction engine may be adapted to take into account feedback resulting from one or more Key Performance Indicator. As described above, a KPI performance feedback engine 24 may be configured 500 to calculate a feedback score based on application of hypothesis test(s) to current versus historic data.

FIG. 5 illustrates as a flowchart an implementation according to which KPI feedback is used to have an impact on a Final Prediction of threshold prediction engine 22. In particular, the flowchart shows how, at step 510
  1) If final score >=0
    a. No Impact on the final output of threshold prediction engine (520)
  2) If final score <0
    a. Then if the final prediction of the "Threshold Prediction" engine 22 was P04

Then, if KPI feedback is taken into account, the threshold(s) actually applied within a network may comprise (P04-x) (530), so the actual implemented output is a step "x" lower than purely predicted or evaluated by the threshold prediction engine, based on historic data and predicted UE performance, where default value of x is 1 but configurable.

Figure 6:
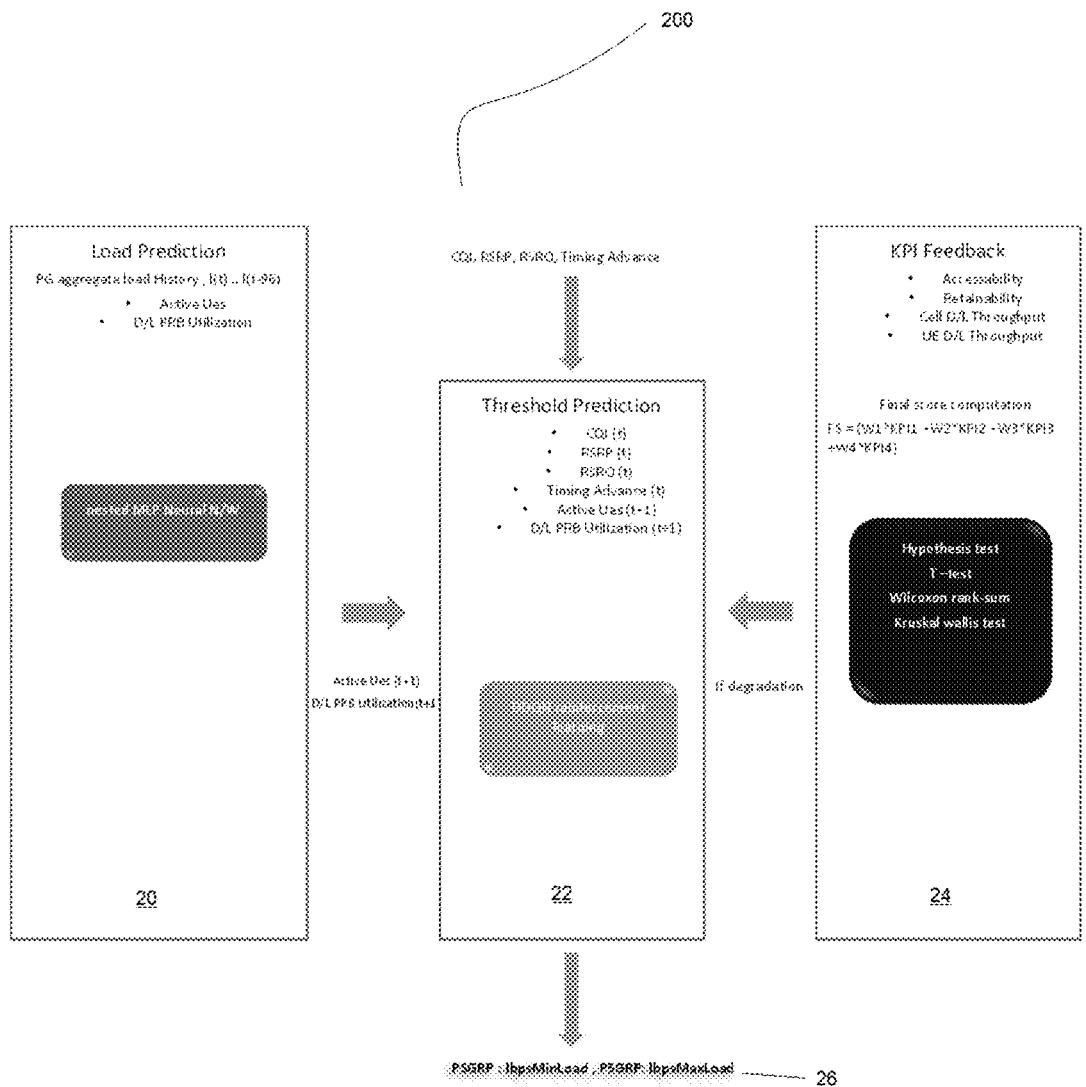
FIG. 6 shows an example embodiment of the present disclosure for determining when a cell should enter or exit a power saving mode.

FIG. 6 is an alternative schematic representation of the system shown in FIG. 3. FIG. 6 shows key main components of a system 200 for evaluating thresholds 26 to apply to implement power saving approaches in a wireless communication network.

Figure 7:
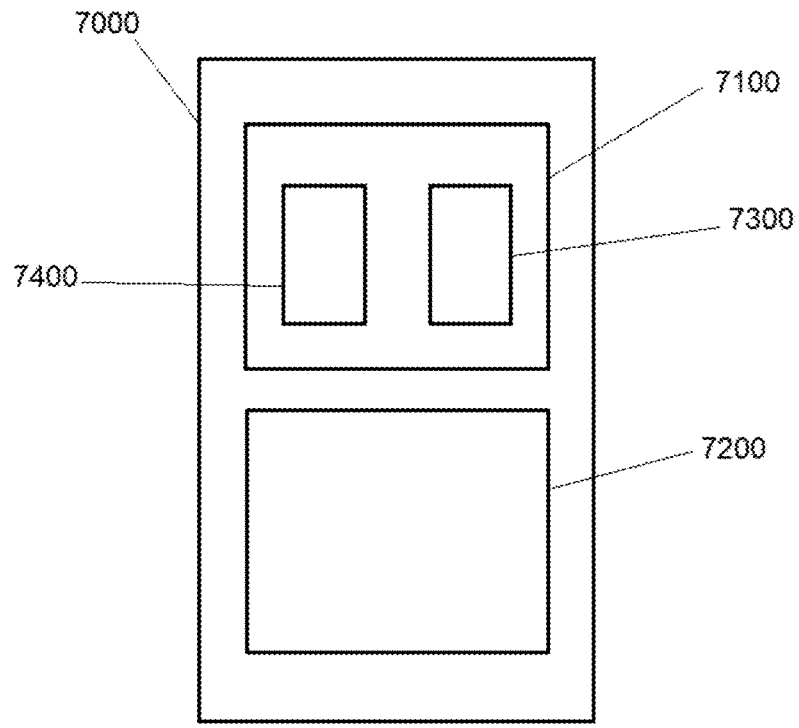
FIG. 7 shows apparatus according to an example arrangement.
Figure 8:
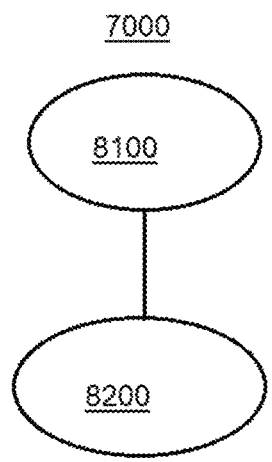
FIG. 8 shows a flow diagram illustrating steps in methods according to an example arrangement.

FIG. 7 shows apparatus according to an example arrangement; and FIG. 8 shows a flow diagram illustrating steps in methods according to an example arrangement.

In particular, FIG. 7 illustrates an apparatus 7000 comprising at least one processor 7100; and at least one memory 7200 storing instructions that when executed by the at least one processor 7100 cause the apparatus at least to: predict a future load in a group of cells supporting network coverage in an area of a wireless communication network based on historical load data for the group of cells; and determine, based at least on the predicted future load, at least one threshold load value for establishing or deciding whether a cell of the group of cells should enter or exit a power saving mode. In some arrangements, the step of predicting may be performed by appropriate prediction circuitry 7300 and the step of determining may be performed by appropriate determination circuitry 7400. That circuitry may form part of the processor 7100.

FIG. 8 shows a flow diagram illustrating steps in methods performed by apparatus such as that shown in FIG. 7.

In particular, apparatus 7000 may be configured to:
- 8100: predict a future load in a group of cells supporting network coverage in an area of a wireless communication network based on historical load data for the group of cells; and
- 8200: determine, based at least on the predicted future load, at least one threshold load value for establishing or deciding whether a cell of the group of cells should enter or exit a power saving mode.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods. The tern non-transitory as used herein, is a limitation of the medium itself (i.e., tangible, not a signal) as opposed to a limitation on data storage persistency (e.g. RAM vs ROM).

As used in this application, the term "circuitry" may refer to one or more or all of the following:
(a) hardware-only circuit implementations (such as implementations in only analog and/or digital circuitry) and
(b) combinations of hardware circuits and software, such as (as applicable):
 (i) a combination of analog and/or digital hardware circuit(s) with software/firmware and
 (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although example embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus comprising:
 at least one processor; and
 at least one memory storing instructions that, when executed by the at least one processor, cause the apparatus at least to:
 predict a future load in a group of cells supporting network coverage in an area of a wireless communication network based on historical load data for the group of cells; and
 determine, based at least on the predicted future load, at least one threshold load value for establishing whether a cell of the group of cells should enter or exit a power saving mode, wherein determining said at least one threshold load value comprises:
 determining a threshold load value for whether the cell of the group of cells should enter the power saving mode; and
 determining a further threshold load value for whether the cell of the group of cells should exit the power saving mode.

2. The apparatus according to claim 1, wherein predicting said future load in the group of cells comprises:
 predicting a load which may occur in the group of cells during at least two time windows; and wherein determining said at least one threshold load value comprises:
 determining the least one threshold load value for each time window based on the predicted load which may occur in the group of cells during that time window.

3. The apparatus according to claim 1, wherein determining said at least one threshold load value is based at least upon assessed network performance in the area of the wireless communication network supported by the group of cells.

4. The apparatus according to claim 3, wherein determining said at least one threshold load value comprises:
 determining a threshold value at which the cell of the group of cells can enter the power saving mode without degrading network performance experienced by user equipment in the area of the wireless communication network supported by the group of cells.

5. The apparatus according to claim 1, wherein said apparatus is configured to adjust the determined at least one threshold load value by:
determining whether a key performance indicator is degrading;
if so, adjusting the determined at least one threshold load value; and
if not, maintaining the determined at least one threshold load value.

6. The apparatus according to claim 5, wherein the key performance indicator indicative of at least one of the following: accessibility, retainability, and downlink cell throughput.

7. The apparatus according to claim 1, comprising a load forecasting machine learning module configured to perform the prediction of the future load in the group of cells supporting the network coverage in the area of the wireless communication network based on the historical load data for the group of cells, wherein the load forecasting machine learning module is configured to use the historical load data to forecast load n minutes in the future where n is an inference frequency of a threshold prediction model applied by the load forecasting machine learning module.

8. The apparatus according to claim 1, comprising a threshold evaluation machine learning module configured to determine, based at least on the predicted future load and one or more parameters indicative of user experience within the group of cells, the at least one threshold load value for establishing whether the cell of the group of cells should enter or exit the power saving mode.

9. The apparatus according to claim 7, comprising a threshold evaluation machine learning module configured to determine, based at least on the predicted future load and one or more parameters indicative of user experience within the group of cells, the at least one threshold load value for establishing whether the cell of the group of cells should enter or exit the power saving mode, wherein the threshold evaluation machine learning module determines the at least one or more-threshold load value based upon: a load prediction output from the load forecasting machine learning module.

10. The apparatus according to claim 8, wherein the threshold evaluation machine learning module is configured to apply a custom reward function, that custom reward function comprising a function which operates to adjust the at least one threshold load value to increase energy saving within the group of cells whilst maintaining the user experience within the group of cells.

11. The apparatus according to claim 8, wherein the threshold evaluation machine learning module is configured to implement a reinforcement learning process.

12. The apparatus according to claim 11, wherein the reinforcement learning process comprises:
applying a custom reward function to a base value, the custom reward function operating to increase energy saving achieved across the group of cells whilst maintaining the user experience operating within the area of network coverage within the wireless communication network supported by the group of cells.

13. The apparatus according to claim 10, wherein the custom reward function comprises: a score associated with a calculated characteristic of the user experience operating within the area of network coverage within the wireless communication network supported by the group of cells.

14. The apparatus according to claim 1, comprising a key performance indicator feedback machine learning module configured to assess whether at least one monitorable key performance indicator of the network is adversely impacted by implementation of the determined at least one threshold load value based upon a monitored indication of the at least one monitorable key performance indicator.

15. The apparatus according to claim 14, wherein the key performance indicator feedback machine learning module is configured to provide feedback to threshold evaluation machine learning module based upon a comparison of one or more experienced monitorable indications within the group of cells compared to one or more predicted monitorable indications within the group of cells.

16. The apparatus according to claim 14, wherein the key performance indicator feedback machine learning module is configured to apply a statistical model to compare measured performance of the group of cells, with one or more historic patterns of performance of the group of cells using at least one hypothesis test.

17. The apparatus according to claim 16, wherein the at least one hypothesis test comprises one or more of: a Mann Whitney test, a T-test, and a Kruskal Wallis test.

18. A computer implemented method comprising:
predicting a future load in a group of cells supporting network coverage in an area of a wireless communication network based on historical load data for the group of cells; and
determining, based at least on the predicted future load, at least one threshold load value for establishing whether a cell of the group of cells should enter or exit a power saving mode, wherein determining said at least one threshold load value comprises:
determining a threshold load value for whether the cell of the group of cells should enter the power saving mode; and
determining a further threshold load value for whether the cell of the group of cells should exit the power saving mode.

19. A computer program product operable, when executed on a computer, to perform the method of claim 18.

20. The apparatus according to claim 3, wherein the assessed network performance is based at least on a downlink characteristic experienced by user equipment in the area of the wireless communication network supported by the group of cells.

* * * * *